April 29, 1941.    E. A. BURNS    2,240,326
LAMINATED INSULATION STRUCTURE
Filed April 6, 1938
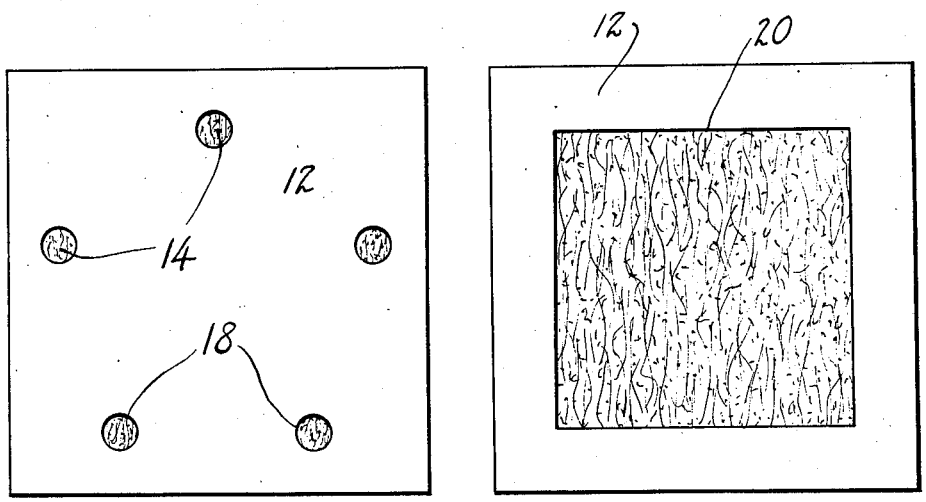
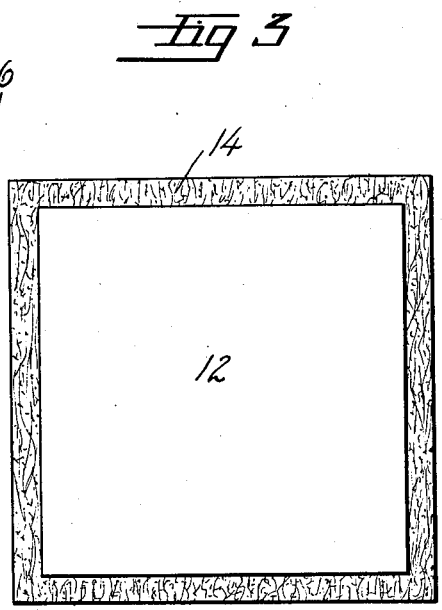
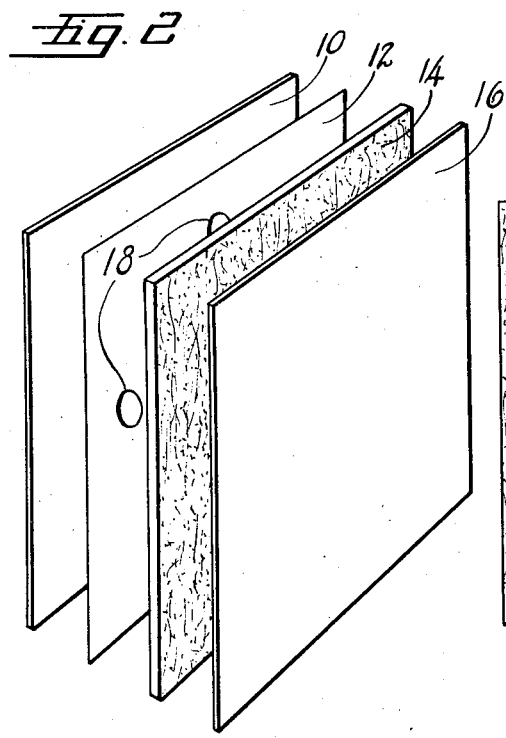
INVENTOR.
EARL A. BURNS
BY Parker & Burton
ATTORNEY.

Patented Apr. 29, 1941

2,240,326

UNITED STATES PATENT OFFICE 2,240,326

LAMINATED INSULATION STRUCTURE

Earl A. Burns, Detroit, Mich., assignor to Woodall Industries Incorporated, Detroit, Mich., a corporation of Michigan Application April 6, 1938, Serial No. 200,341

3 Claims. (Cl. 154—44)

My invention relates to an improved laminated insulation structure and to an improved method of fabricating the same, and particularly to improvements in the insulation of metal panels having sound vibration damping material in the form of sheets or layers adhered to one surface of the metal panel. I provide an improved damping sheet or layer adapted to be attached to the metal panel and improvements in the means of securing the damping layer or sheet to the metal panel. The object is to materially increase the efficiency of the insulation throughout a desired determined range of frequency of vibration.

It has heretofore been the practice to secure relatively inert vibration damping material in the form of sheets, layers or the like to a metal panel to dampen the vibration of the panel and to reduce the objectionable noise. This sound damping material has been in the form of asphalt saturated sheets or layers, or sheets or layers of plastic or mastic composition which may include asphalt or some other suitable thermoplastic binder. It has been common practice to adhesively secure such layer or sheet to one surface of the metal panel throughout the juxtaposed areas to dampen or deaden the vibration of the panel. This practice has been extensively followed in the automobile industry. Such treatments have been applied to the side wall or the floor panel on many kinds of vehicles.

I have found that the sound damping value of such layer or sheet of inert material to a sheet steel panel is materially improved if, instead of adhering the damping layer to the steel panel throughout the entire juxtaposed area, it is adhered thereto only through a portion of such juxtaposed area and I have found that the sound damping value is enhanced by adhesion only through selected restricted separated areas.

It has furthermore been found that if the layer of sound damping material, which may be asphalt saturated felt or a composition of asphalt and fibers or other bulk forming material or any other suitable sound damping layer, is adhered to the steel panel throughout a localized relatively small area or throughout widely separated small areas that the rate of decay of sound vibration may be increased from two to better than five fold. This adhesion throughout a relatively restricted small area may be by way of adhesion along the margin of the panel or adhesion at the center of the panel or a combination thereof, or by way of adhesion throughout separated local spot areas.

It has furthermore been found that an improved form of sound damping layer prepared for adhesion in this manner is a layer of sound damping material having one surface adapted under the influence of heat to self-adhere to the steel panel or adapted upon suitable treatment to so adhere, which surface is provided with a covering layer of a thin sheet of paper or the like. This covering layer is so shaped or formed or cut out at intervals as to provide areas throughout which the adhesive surface of the sound damping layer may directly contact and be adhered to the metal sheet but which covering or separator sheet elsewhere separates the damping layer from the metal sheet and prevents adhesion.

Such type of securement may be provided in many ways. The separator sheet may correspond in shape to the damping layer but may be smaller in size whereby the damping layer has its marginal portion in contact and adhesion with the steel sheet. The separator sheet may be of the same size as the damping layer but have a central area cut out through which contact and adhesion is obtained. The separator sheet may have a plurality of selectively spaced restricted apertures through which contact and adhesion of the damping layer with the steel sheet is obtained.

Other objects, advantages, and meritorious features of this invention will more fully appear from the following description, appended claims, and accompanying drawing, wherein:

Figure 1 is a perspective of the elements which comprise my improve laminated structure shown separated, Fig. 2 is an elevation of the sound deadening layer overlaid with the apertured paper sheet, Figs. 3 and 4 are elevations similar to Fig. 2 but of modified constructions.

In the various figures of the drawing the invention is illustrated as embodied in formations which differ slightly from each other. The damping lamination or layer may be in the form of a sheet of material which has one surface that is adapted upon being subjected to heat to adhere to the metal sheet, or such surface may be of such a character that some solvent may be applied thereto to produce adhesion. On the other hand, this damping layer might be in the form of a layer spread over or sprayed upon the metal sheet rather than a preformed sheet or layer. Suitable asphaltic composition including plasticizer and bulk forming material are available and may be used in this manner.

In either event a preferred method for obtaining the securement throughout only a partial or restricted portion of the juxtaposed area is by the provision of a separator sheet as shown. This separator sheet may take different forms. It may be a thin sheet of paper through which the thermoplastic binder will not flow readily for adhesion and which is cut to such a size that the margin of the damping layer directly contacts the steel sheet around the margin of the separator sheet. On the other hand, the separator sheet may have a portion cut out at its center so as to obtain central adhesion of the damping layer. One preferred form is to provide the separator sheet with a plurality of restricted selectively spaced apart apertures and to secure this separator sheet adhesively to a layer of damping material so that throughout the area of these apertures the damping material is exposed to direct contact and adhesion with the steel sheet. Throughout the area of these apertures the damping layer will adhere to the steel sheet but elsewhere throughout the area of the separator sheet there will not be adhesion.

In Fig. 1 the metal panel is indicated as 10, the separator sheet as 12, and the sound damping layer is a duplex layer composed of the two laminations 14 and 16. The laminations 14 and 16 are duplexed to jointly make up the sound damping layer. In this form the lamination 14 may be an asphaltic fiber composition formed of relatively low melt point asphalt and suitable bulk forming filler or fibers. Disintegrated tire fibers or any other suitable light weight bulk forming material may be used. The top layer 16 may be an asphalt saturated felt or a latex treated paper sheet or any other suitable sheet which will prevent flowing of the asphalt binder from the lamination 14 through the top layer 16 so as to smear the top surface. The separator sheet 12 may be a thin sheet of paper which is relatively impervious to the flow of the asphalt binder therethrough. This paper sheet may be provided with a plurality of apertures 18 through which the thermoplastic layer 14 is exposed as shown in Fig. 1 to contact and adhere to the metal sheet.

Fig. 2 is an elevation of the outside of the sound deadening layer showing the apertures through the paper separator sheet 12.

Such paper sheet instead of being provided with a plurality of apertures 18 may be cut out at the center, as at 20, in Fig. 3 exposing the entire central area of the sound damping layer to directly contact with the metal sheet. In Fig. 4 the separator sheet is shown as cut off at its margin so as to expose its marginal portion to direct contact with the metal sheet. If desired a small aperture might also be provided at the center so as to provide a combination of marginal and central adhesion.

Tests have been made of insulation of this character with 100% adhesion of the sound deadening layer to the steel lamination as compared with partial adhesion as herein set forth. Such partial adhesion may vary from 2% to 5% of the total area. For example, a square twenty inch panel of damping material of a composition of asphalt binder and bulk forming particles (a commercial product known as Mastex) fully adhered to a steel sheet throughout its entire juxtaposed area required ten seconds for sixty decibels decay. Partial adhesion as hereinabove described throughout selected restricted areas reduced this time period for sixty decibels decay from ten seconds to less than two seconds.

In certain tests with adhesion through spaced apart spots of one to two inches, aggregate adhered area of from 2% to 10% total area sixty decibels decay required 1.8 seconds to two seconds. In certain other tests with marginal adhesion and central area adhesion, aggregate adhered area 10% to 25% total area, time of decay was reduced from 11 seconds to 2.1 seconds. The enviorment of the tests was in all cases the same except for variation in extent of adhered area. Panels were of the same size, weight, and structure.

If the sound deadening lamination were not a preformed layer but formed as a layer in situ by spraying or otherwise spreading a plastic compound over the metal sheet the separator sheet might be provided as described and be first placed over the metal sheet. The separator sheet might, if desired fully cover the steel sheet but be free therefrom throughout the major part of its area being secured thereto only throughout a selected restricted area and the sound deadening layer be secured to the steel sheet only through the adhesion of the separator sheet, being free from the steel sheet throughout the free area of the separator sheet.

What I claim:

1. A laminated vibration damping panel structure of the character described comprising a vibratory metal lamination, a lamination of inert vibration damping material overlying said metal lamination and carrying an asphaltic binder, a separator sheet interposed between said metal lamination and damping lamination preventing adhesion therebetween throughout the major area of the separator sheet, said separator sheet cut away providing a plurality of relatively small, relatively widely spaced apart apertures throughout which the damping sheet directly contacts and is adhesively secured to the metal sheet by said asphaltic binder, the said areas in the aggregate varying from 2% to 25% of the juxtaposed areas.

2. A laminated vibration damping panel structure of the character described comprising a vibratory metal lamination, a lamination of inert vibration damping material carrying an asphaltic binder and overlying said metal lamination, a separator sheet of paper interposed between said metal lamination and damping lamination adhesively secured to the damping lamination but substantially free throughout its contacting area from the metal lamination, said separator sheet being of such an area as to expose said metal lamination to direct contact with and adhesive engagement by the damping lamination throughout an area of between 2% to 25% of the area of the metal lamination overlaid by the damping lamination.

3. A laminated vibration damping panel structure of the character described comprising a vibratory metal sheet, a lamination of inert dense, heavy, plastic vibration damping material in juxtaposing contact with said metal sheet and adhesively secured thereto throughout an area not exceeding 2% to 25% of its juxtaposed area, said damping lamination being throughout the remainder of its juxtaposed area free from but disposed to contact said metal sheet

EARL A. BURNS.